United States Patent [19]

Mueller et al.

[11] 4,375,988

[45] Mar. 8, 1983

[54] BITUMINOUS BINDER, PROCESS FOR ITS PRODUCTION AND USE

[75] Inventors: Karl-Hans Mueller, Bruchkoebel; Walter Barthel, Langenselbold, both of Fed. Rep. of Germany

[73] Assignee: Degussa Aktiengesellschaft, Frankfurt, Fed. Rep. of Germany

[21] Appl. No.: 281,736

[22] Filed: Jul. 9, 1981

[30] Foreign Application Priority Data

Jul. 26, 1980 [DE] Fed. Rep. of Germany ....... 3028365

[51] Int. Cl.³ .............................................. C08L 95/00
[52] U.S. Cl. ................................ 106/273 R; 106/274; 106/281 R; 428/468
[58] Field of Search ................... 106/273, 281, 274; 428/468; 556/427, 429

[56] References Cited

U.S. PATENT DOCUMENTS

| 2,400,563 | 5/1946 | Mark | 106/281 R |
|---|---|---|---|
| 2,595,465 | 5/1952 | Keene et al. | 106/281 R |
| 2,759,843 | 8/1956 | Hardman et al. | 106/281 R |
| 3,461,094 | 8/1969 | Wesch | 260/42.15 |
| 3,842,111 | 10/1974 | Meyer-Simon | 556/429 |
| 3,946,059 | 3/1976 | Janssen et al. | 556/429 |
| 3,965,281 | 6/1976 | Takase et al. | 106/281 R |
| 4,173,489 | 11/1979 | Crawford et al. | 106/281 R |

OTHER PUBLICATIONS

Chem. Abstract 54:25,782.

*Primary Examiner*—Theodore Morris
*Attorney, Agent, or Firm*—Joseph A. DeGrandi; Richard G. Kline; Robert G. Weilacher

[57] ABSTRACT

Bituminous binders are disclosed which contain at least one silane and show excellent improvement of adhesion. The bituminous binder containing silane is manufactured by heating The bituminous binder to a temperature of 120°–230° C. and stirring in the silane. All known silanes can be used as the silane. The resulting compositions can be used for the production of street surfacings, industrial floors, floorings, building protective paints, roof coating masses, undercoatings for motor vehicles and rail vehicles, and cable covering compounds.

10 Claims, No Drawings

BITUMINOUS BINDER, PROCESS FOR ITS PRODUCTION AND USE

Bituminous binders are utilized for the most various purposes. They are used, for example, in road surfacing, in industrial floors, in floorings, in building protective paints, in roof coatings, in roofing strips, in undercoatings for motor and rail vehicles, and in cable covering compounds.

It is known to add long-chain amines to such bituminous binders to improve their adhesion to fillers or other surfaces to be coated (cf. booklet "Goldschmidt informiert 4/78 No. 46").

However, such amine-containing bituminous binders have the disadvantage that because of the heat-instability of the long-chain amines their adhesiveness is severely impaired.

The object of the invention is a bituminous binder which is characterized in that it contains at least one silane.

As the silane, the bituminous binder can contain all known silanes.

Thus the bituminous binder can contain as the silane the following compounds, singly or in a mixture:
Trichlorosilane
Chloropropyltrichlorosilane
Chloropropyltriethoxysilane (Cl—$C_3H_6$—$Si(OC_2H_5)_3$)
Chloropropyltrimethoxysilane (Cl—$C_3H_6$—$Si(OCH_3)_3$)
Vinyltrichlorosilane
Vinyltriethoxysilane ($H_2C=CH-Si(OC_2H_5)_3$)
Vinyltrimethoxysilane ($H_2C=CH-Si(OCH_3)_3$)
Vinyl-tris-($\beta$-methoxy-ethoxy)silane
($H_2C=CH-Si(O-C_2H_4-O-CH_3)$)
Vinyl triacetoxysilane ($H_2C=CH-Si(-OOC-CH_3)_3$)
Vinyltris(t-butylperoxy)silane
($H_2C=CH-Si(OO\ C_4H_9)_3$
Vinylmethyldiethoxysilane
$\beta$-(N-vinylbenzylamino)ethyl-$\gamma$-amino-propyltrimethoxy-silane mono hydrogen chloride
$\gamma$-aminopropyltriethoxysilane
($H_2N-CH_2-CH_2-CH_2-Si(OC_2H_5)_3$)
N,N-bis($\beta$-hydroxyethyl)-$\gamma$-aminopropyl-triethoxysilane
($OH-C_2H_4)_2N-C_3H_6-Si(-O-C_2H_5)_3$
N-$\beta$-aminoethyl-$\gamma$-aminopropyl-trimethoxysilane
($H_2N-C_2H_4-NH-C_3H_6-Si(OCH_3)_3$)
N-$\beta$(aminoethyl)-$\gamma$-aminopropyl-ethyl-dimethoxysilane
($H_2N-C_2H-NH-C_3H_6-Si(CH_3)_2-C_2H_5$)
Methyl(aminoethoxy-propyl-diethoxy)silane
($H_2N-(CH_2)_2-O(CH_2)_3-Si(CH_3)_2-(OC_2H_5)_2$)
Aminoethylaminopropyltridecyloxysilane
($H_2N-(CH_2)-NH-(CH_2)_3-Si(OC_{10}H_{21})_3$)
$\gamma$-mercaptopropyltrimethoxysilane
Cyclohexylamino-propyltrimethoxysilane

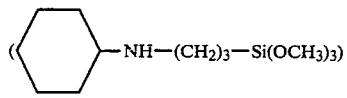

$CH_3OOC-(CH_2)_2-NH-(CH_2)_2-NH(CH_2)_3-Si(OCH_3)_3$
$\gamma$-methacryloxypropyltriethoxysilane
($H_2C=C(CH_3)COO-(CH_2)_3-Si(OC_2H_5)_3$)
$\gamma$-methacryloxypropyl-tris(2-methoxyethoxy)silane
($H_2C=C(CH_3)COO-(CH_2)_3-Si(OC_2H_4-OCH_3)_3$)
$\beta$-(3,4-epoxycyclohexyl)ethyltrimethoxysilane

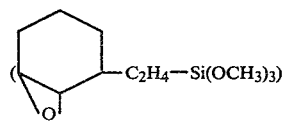

Epoxycyclohexyltrimethoxysilane

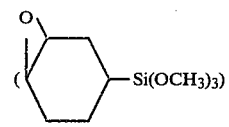

$\gamma$-glycidopropyltriethoxysilane

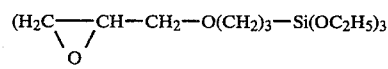

Methyltrimethoxysilane
Vinyltriethoxysilane $H_2C=CH-Si(OC_2H_5)_3$
Sulfur-containing silanes, such as, e.g.,
Bis-(3-[triethoxysilyl-]propyl)tetra(sulfur hydride)
Bis-(3-[triethoxysilyl-]propyl)tri(sulfur hydride) and/or
Bis-(3-[triethoxysilyl-]propyl)di(sulfur hydride)
can be utilized as the preferred silanes.

In a preferred embodiment of the invention, the bituminous binder may contain 0.05–2, in particular 0.5–1.5, wt.% silane.

According to the invention, the bituminous, silane-containing binder can be produced in that the bituminous binder is heated to a temperature of 180°–230° C. and the silane is stirred in.

In an embodiment of the invention, the silane can be mixed, before being stirred into the bituminous binder, with a synthetic, amorphous precipitated silica to form a powder concentrate. The powder concentrate can contain 65–68 wt.% silane and 32–35 wt.% precipitated, spray-dried silica.

The bituminous binder according to the invention can be used for the production of hot rolled asphalt for roadmaking and also for the production of special coatings, as used, e.g., for bridges. It can likewise be used for the production of mastic asphalt for roadmaking or superstructures (e.g., industrial floors and floorings) or the production of roof coatings, roofing lengths, undercoatings for vehicles, or cable covering compounds.

Because of the silane content, the bituminous binder according to the invention shows an excellent improvement in adhesiveness.

EXAMPLE

Asphalt mixtures were produced and tested analogously to DIN 1996, Sheets 2, 3, 10. A stone critical for adhesiveness was selected: Taunus quartzite Special Fragments 8/11 of Taunus-Quartzit-Werke GmbH, Bad Homburg v.d.H. Bitumen B 200 was used as the bituminous binder, and was respectively heated to 125° C. and mixed with the added silane.

| Mixture | Binder Used |
|---|---|
| 1 | 99 parts/wt. B 200 |

-continued

| Mixture | Binder Used |
|---|---|
|  | 1 part/wt. Si 69 |
| 22 | 99 parts/wt. B 200 |
|  | 1 part/wt. A 189 |
| 3 | 99 parts/wt. B 200 |
|  | 1 part/wt. Cl-PTES |
| 4 | 99 parts/wt. B 200 |
|  | 1 part/wt. A 172 |
| 5 | 99 parts/wt. B 200 |
|  | 1 part/wt. A 1100 |
| 6 | 99 parts/wt. B 200 |
|  | 1 part/wt. A 187 |
| 7 | 99 parts/wt. B 200 |
|  | 1 part/wt. A 174 |
| 8 | 99 parts/wt. B 200 |
|  | 1 part/wt. A 151 |
| 9 | 98.8 parts/wt. B 200 |
|  | 1.2 parts/wt. Si 69 |
| 10 | 98.8 parts/wt. B 200 |
|  | 1.2 parts/wt. A 172 |
| 11 | 98.8 parts/wt. B 200 |
|  | 1.2 parts/wt. A 1100 |
| 12 | 98.8 parts/wt. B 200 |
|  | 1.2 parts/wt. A 174 |
| 13 | 98.2 parts/wt. B 200 |
|  | 1.8 parts/wt. powder concentrate: 66.7% Si 69/33.3% SIPERNAT 22 |
| 14 | 98.2 parts/wt. B 200 |
|  | 1.8 parts/wt. powder concentrate: 66.7% A 172, 33.3% SIPERNAT 22 |
| 15 | 98.2 parts/wt. B 200 |
|  | 1.8 parts/wt. powder concentrate: 66.7% A 174, 33.3% SIPERNAT 22 |

For the trial references 13–15, the powder concentrate was prepared from 66.7% of the respective silane and 33.3% of SIPERNAT 22.

The silanes used have the following chemical structures:
Si 69: Bis-(3-[triethoxysilyl]-propyl)tetra(hydrogen sulfide)
A 189: γ-mercaptopropyltrimethoxysilane
Cl-PTES: γ-chloropropyltrimethoxysilane
A 172: Vinyl-tris-(β-methoxyethoxy)silane
A 1100: γ-aminopropyltriethoxysilane
A 187: γ-glycidopropyl-triethoxysilane
A 174: γ-methacryloxypropyltrimethoxysilane
A 151: Vinyltriethoxysilane

| Ref. | Softening point Ring and ball °C. | Results Binder-free stone surface, parts/wt. | Improvement in % initial values 40 parts/wt. = 0% |
|---|---|---|---|
| 0 | 42.6 | 40 | 0 |
| 1 | 40.2 | 15 | 63 |
| 2 | 40.4 | 10 | 75 |
| 3 | 41.7 | 25 | 38 |
| 4 | 40.8 | 10 | 75 |
| 5 | 40.9 | 5 | 88 |
| 6 | 39.8 | 15 | 63 |
| 7 | 39.9 | 10 | 75 |
| 8 | 41.0 | 15 | 63 |
| 9 | 39.7 | 15 | 63 |
| 10 | 40.6 | 10 | 75 |
| 11 | 40.2 | 5 | 88 |
| 12 | 40.8 | 10 | 75 |
| 13 | — | 15 | 63 |
| 14 | — | 5 | 88 |
| 15 | — | 10 | 75 |

With mixtures 9–15, hot storage was carried out at 150° C. for 24 hours, with exclusion of air. The adhesion tests subsequently carried out gave exactly the same results as the untreated samples. The temperature- or storage-insensitivity was thus confirmed.

As is to be gathered from the test data, all the silanes utilized are suitable as adhesion improvers in bituminous systems. Different degrees of action and side-effects such as odor and vapor development are to be determined. In practice, however, as high as possible a boiling point of the silane is of importance, apart from the improvement of adhesive action. Thus, from the 8 tested silanes a selection was made of three types (Si 69, A 172, A 174) which were used for further trials:

Testing in powder form (66.7% silane, 33.3% SIPERNAT 22). 24-hour heat storage at 150° C. with exclusion of air:

It was established that:

The adhesive action of the powder concentrates remains fully maintained; heat storage has no negative influence.

This information is very important, since the silane powder concentrates have a suitable form for sale, and furthermore provide a simple kind of portioning-out into bituminous systems, from a practical viewpoint. If the silanes are added directly to the hot bitumen, the "ring and ball" softening point in °C. is reduced by 2 points on average, which means a viscosity reduction which is desired in many cases. The heat stability, that is, retention of the adhesion-improving action after hot storage, represents a substantial improvement over the adhesion additives based on long-chain amines. It is known concerning these products that they can first be added shortly before the processing of the bituminous binder, and are not stable to hot storage.

We claim:

1. A composition comprising a bituminous material and a silane, wherein the silane is bis-(3-[triethoxysilyl]propyl)tetra(sulfur hydride), bis-(3-[triethoxysilyl]propyl)tri(sulfur hydride) or bis-(3-[triethoxysilyl]propyl)di(sulfur hydride).

2. The composition as defined in claim 1 wherein the silane is present in the amount of about 0.05 to 2 weight percent based on the total weight of the composition.

3. The composition as defined in claim 1 which additionally contains a synthetic, amorphous precipitated silica in powder form.

4. The composition as defined in claim 1 wherein the silane is a sulfur containing silane.

5. A process for the production of a bituminous binder comprising heating a bituminous material to a temperature of 180° to 230° C. and adding a silane thereto with stirring.

6. The process of claim 5 wherein the silane is added in the amount of 0.05 to 2 weight percent based on the total weight of the composition.

7. The process of claim 5 wherein the silane is mixed with a synthetic, amorphous precipitated silica in powder form prior to being mixed with the bituminous material.

8. A method of coating a road with a protective surface comprising depositing on a roadway the composition of claim 1.

9. A method of preparing a flooring or roof comprising depositing on a floor or roof surface the composition of claim 1.

10. A method of undercoating a vehicle to provide a protective coating therefore comprising applying to the underside of a vehicle the composition of claim 1.

* * * * *